US012224949B2

(12) United States Patent
Bhola

(10) Patent No.: US 12,224,949 B2
(45) Date of Patent: Feb. 11, 2025

(54) SYSTEMS AND METHODS FOR EPOCH LAST IN FIRST OUT (LIFO) ADMISSION CONTROL

(71) Applicant: Cockroach Labs, Inc., New York, NY (US)

(72) Inventor: Sumeer Kumar Bhola, Brooklyn, NY (US)

(73) Assignee: Cockroach Labs, Inc., New York, NY (US)

(*) Notice: Subject to any disclaimer, the term of this patent is extended or adjusted under 35 U.S.C. 154(b) by 0 days.

(21) Appl. No.: 18/046,693

(22) Filed: Oct. 14, 2022

(65) Prior Publication Data
US 2024/0129256 A1    Apr. 18, 2024

(51) Int. Cl.
*H04L 43/106* (2022.01)
*H04L 47/62* (2022.01)

(52) U.S. Cl.
CPC ........ *H04L 47/6245* (2013.01); *H04L 43/106* (2013.01); *H04L 47/6225* (2013.01)

(58) Field of Classification Search
CPC ............. H04L 47/6245; H04L 47/6225; H04L 43/106
See application file for complete search history.

(56) References Cited

U.S. PATENT DOCUMENTS

| 9,929,743 | B1* | 3/2018 | Acuña-Rohter | ........ H03M 7/30 |
| 10,585,881 | B2* | 3/2020 | Colrain | ................... G06F 16/84 |
| 2006/0233177 | A1* | 10/2006 | Basso | ..................... H04L 47/50 |
| | | | | 370/428 |
| 2022/0067025 | A1* | 3/2022 | Terry | .................... G06F 16/182 |

FOREIGN PATENT DOCUMENTS

CN          114138054          * 3/2018

OTHER PUBLICATIONS

Pat Morin "Open Data Structures", https://opendatastructures.org/newhtml/ods/latex/intro.html (Year: 2019).*
Morin "Open Data Structures", https://opendatastructures.org/newhtml/ods/latex/intro.html (Year: 2019).*
(Continued)

*Primary Examiner* — James E Springer
*Assistant Examiner* — Patrick F Ngankam
(74) *Attorney, Agent, or Firm* — Goodwin Procter LLP

(57) ABSTRACT

Methods and systems for managing requests in a distributed computing system are provided. A plurality of requests are received by one or more of the plurality of computing nodes in the distributed computing system. A respective timestamp is assigned to each of the plurality of requests. A subset of the plurality of requests are assigned to an epoch, wherein the epoch corresponds to an interval of time comprising the respective timestamp of each request of the subset of the plurality of requests. A present time is compared to a closing time of the epoch. Based on the comparison, the subset of the plurality of requests are queued for execution in a waiting data structure by last-in, first-out (LIFO) ordering based on the respective timestamp of each request of the subset.

32 Claims, 8 Drawing Sheets

(56) References Cited

OTHER PUBLICATIONS

Corbett et al., "Spanner: Google's Globally Distributed Database," ACM Transactions on Computer Systems, vol. 31, No. 3, Article 8, Aug. 2013, 22 pages.
Geng et al., "Exploiting a Natural Network Effect for Scalable, Fine-grained Clock Synchronization," https://www.usenix.org/conference/nsdi18/presentation/geng—Apr. 2018, 15 pages.
Maurer, Ben, "Fail at Scale: Reliability in the Face of Rapid Change," Association for Computing Machinery, vol. 13, No. 8, Sep. 2015, 17 pages.
Twitter post entitled "There are a lot of smart people working with queuing theory that applies here." 1 page, posted Aug. 4, 2018 by user "@jbeda". Retrieved from Internet: <https://twitter.com/jbeda/status/1025892269621010432>.
Yanacek, David, "Using load shedding to avoid overload," available as of May 8, 2021 according to Wayback Machine Internet Archive Record, obtained from: http://web.archive.org/web/20210508060247/https://d1.awsstatic.com/builderslibrary/pdfs/using-load-shedding-to-avoid-overload.pdf, 13 pages.

\* cited by examiner

400

500

SYSTEMS AND METHODS FOR EPOCH LAST IN FIRST OUT (LIFO) ADMISSION CONTROL

FIELD OF TECHNOLOGY

The present disclosure relates generally to methods and systems for managing request ordering within a distributed system and more particularly, to managing requests based on last in, first out admission control techniques.

BACKGROUND

In some cases, for a distributed computing system (e.g., distributed database system), individual computing devices (referred to as "nodes") can receive requests from other nodes in the system. To prevent resource overload (e.g., for central processing units (CPUs), disk bandwidth, input/output operations per second (IOPS), memory, etc.), nodes can execute admission control techniques for received requests (e.g., received key-value (KV) operations included in a transaction). Such per-node admission control can be particularly beneficial for stateful distributed systems, where an individual request can execute for only a subset of the nodes included in the system. Some non-limiting examples of stateful distributed systems can include distributed file systems, distributed KV stores, distributed databases (e.g., online transactional processing (OLTP) or online analytical processing (OLAP) databases).

Admission control techniques can order received requests based on attributes corresponding to each request, such as priority, identifier(s) indicative of a source of the request, etc. First-in, first-out (FIFO) ordering can be used as a part of admission control techniques to order requests having similar attributes (e.g., a same priority level, a same timestamp, etc.). FIFO admission control techniques are commonly used to ensure fairness between received requests, and can typically provide low latency. FIFO queueing can also use an explicit timestamp included in and/or corresponding to a request to control ordering of a queue. That is, generalized FIFO queueing order may not be limited to using an implicit arrival (e.g., assigned starting) timestamp corresponding to a request.

In some cases, FIFO admission control techniques can be problematic if an excessive queueing delay develops in the FIFO queue, such that by a time a request reaches the front of the FIFO queue, the end-user that initiated the request may have lost interest in the response to the request. In other words, an implicit or explicit deadline for receiving a response to the request can be exceeded when a queueing delay of the FIFO queue exceeds or approaches a threshold amount of time. For such a system using FIFO admission control techniques, the effective throughput (also referred to as "goodput"), has been reduced to 0. Accordingly, last-in, first out (LIFO) queuing techniques may be an alternative to FIFO queueing techniques for admission control systems. LIFO queuing techniques can reduce the median latency for execution of received requests at the expense of higher tail latency for received requests. LIFO queuing techniques may enable a system to use admission control techniques and avoid effective throughput collapse. Effective throughout collapse can be avoided and/or minimized based on serving a number (e.g., higher number) of received requests before an expiry of an implicit or explicit deadline associated with the requests.

In some cases, distributed systems (e.g., distributed database systems) can separate work (e.g., requests, transactions, etc.) received from a user into multiple smaller requests that can be distributed to different computing nodes in the system. In some cases, a sequence of work items received from a particular user may need to be served and/or otherwise executed within a threshold amount of time (e.g., to be useful to the user). As an example, for transaction processing distributed databases, each transaction may have multiple statements (e.g., including multiple work items) that are issued in sequence by the user, and each statement may be split into multiple requests (e.g., reading and/or writing parts of a table that is separated and stored by multiple nodes). For a transaction's result to be useful for the user, the entire transaction may be required to complete within a threshold amount of time.

Conventional LIFO schemes tend to be incompatible with work-sequences (e.g., an ordered sequence of work) and work that is separated into smaller requests. As an example, when LIFO queueing is applied to individual requests of a work-sequence, it is likely that a first node of the distributed system quickly executes a request of a work-sequence, while a second node of the distributed system receives a second request of the work-sequence and queues the second request behind later arriving requests, thereby causing the second node to execute the second request after a threshold amount of time (e.g., after a deadline expires). Thus, LIFO queuing techniques used for work-sequences can inhibit work-sequences from completing within a threshold amount of time (e.g., a deadline), resulting in effective throughput collapse for the distributed system.

SUMMARY

Methods and systems for managing requests by epoch-based, LIFO admission control techniques are disclosed. In one aspect, embodiments of the invention feature a method for managing requests in a distributed computing system comprising a plurality of computing nodes. According to one embodiment, the method can include receiving, by one or more of the plurality of computing nodes in the distributed computing system, a plurality of requests. The method can include assigning a respective timestamp to each of the plurality of requests. The method can include assigning a subset of the plurality of requests to an epoch, wherein the epoch corresponds to an interval of time comprising the respective timestamp of each request of the subset of the plurality of requests. The method can include comparing a present time to a closing time of the epoch. The method can include queuing, based on the comparison, the subset of the plurality of requests for execution in a waiting data structure by last-in, first-out (LIFO) ordering based on the respective timestamp of each request of the subset.

In some embodiments, a work-sequence can include one or more work items, and wherein the one or more work items include the subset of the plurality of requests. Each respective timestamp can be assigned by a respective gateway node of the plurality of computing nodes in the distributed computing system. Each request of the subset can be directed to a receiving node of the plurality of computing nodes in the distributed computing system. The present time corresponds to a time of a clock of the receiving node. The method can further include receiving, by a receiving node of the plurality of computing nodes in the distributed computing system, the subset of the plurality of requests.

In some embodiments, comparing the present time to the closing time of the epoch can further include: determining the present time is less than the closing time of the epoch or determining the present time is equivalent to or greater than the closing time of the epoch. The method can further include queuing, based on the comparison, the subset of the plurality of requests for execution in an open data structure by first-in, first-out (FIFO) ordering based on the respective timestamp of each request of the subset. The method can further include determining the waiting data structure does not include at least one request and the open data structure includes at least one request; and dequeuing, based on the determination, the at least one request from the open data structure for execution. The method can further include determining the waiting data structure includes at least one request; and dequeuing, based on the determination, the at least one request from the waiting data structure for execution.

In another aspect, the invention features a system for managing requests. The system can include corresponding computer systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The above and other preferred features, including various novel details of implementation and combination of events, will now be more particularly described with reference to the accompanying figures and pointed out in the claims. It will be understood that the particular methods and systems described herein are shown by way of illustration only and not as limitations. As will be understood by those skilled in the art, the principles and features described herein may be employed in various and numerous embodiments without departing from the scope of any of the present inventions. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefore, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the generally description given above and the detailed description of the preferred embodiments given below serve to explain and teach the principles described herein.

Figure 1:
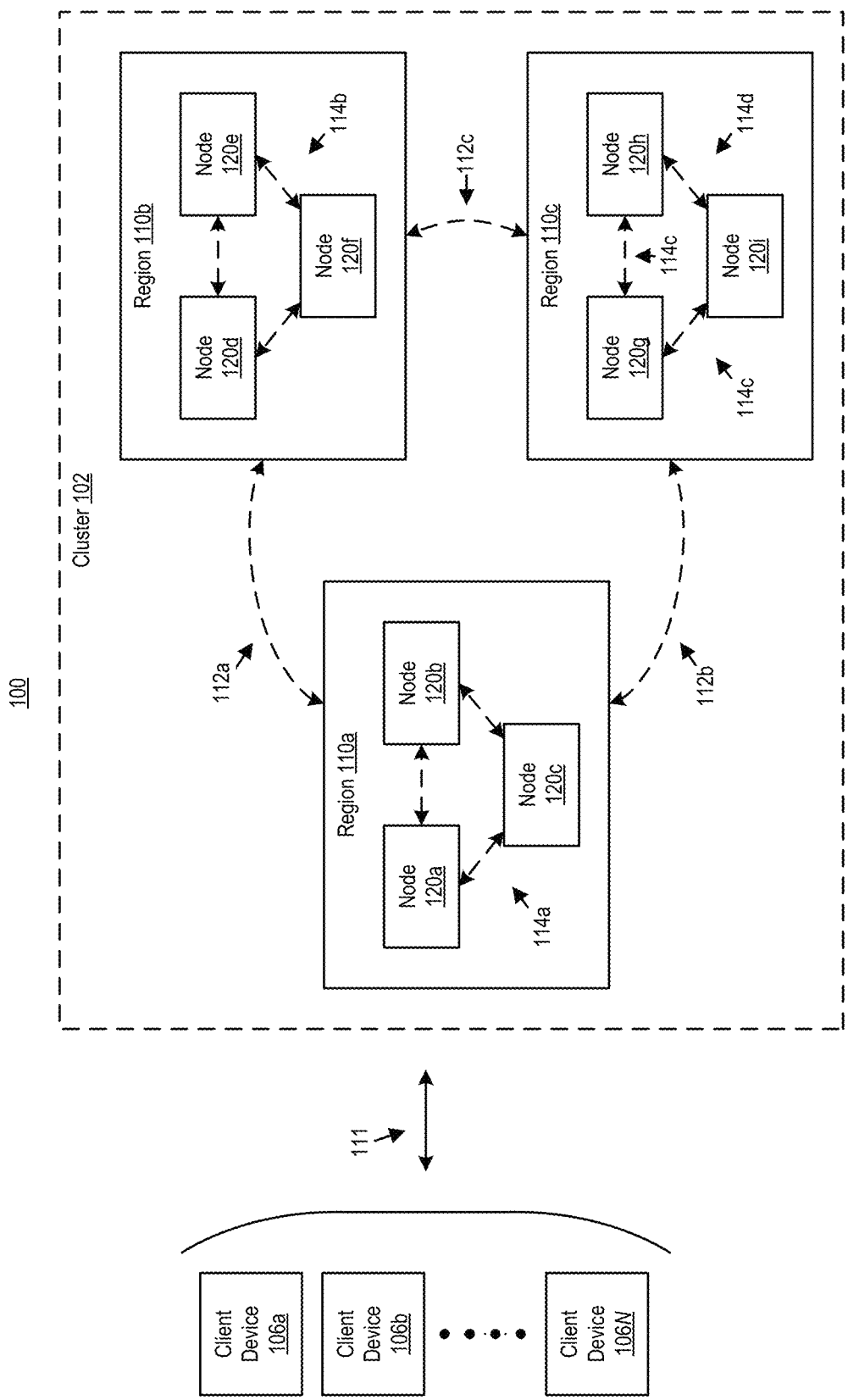
FIG. 1 shows an illustrative distributed computing system, according to some embodiments.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

Methods and systems for managing requests by epoch-based, LIFO admission control techniques are disclosed. It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details.

Motivation for Some Embodiments

As described above, conventional LIFO queuing techniques used by distributed system can be incompatible with work-sequences, as effective throughput can be significantly reduced based on entire work-sequences completing after a threshold amount of time (e.g., a deadline). Accordingly, improved systems and methods managing requests by epoch-LIFO queuing can be used to remedy the deficiencies of existing FIFO and LIFO admission control techniques used in distributed systems.

In some embodiments, systems and method for epoch-LIFO queuing can apply LIFO queueing to serve requests included in work-sequences. In some cases, epoch-LIFO queuing can use clock synchronization among nodes of a distributed system to coordinate request execution, thereby replacing computationally expensive and/or failure intolerant explicit coordination across nodes. Improvements in clock synchronization among nodes of a distributed system (e.g., a globally distributed system) have enabled epoch-LIFO queuing by allowing for less than 1 millisecond (ms) clock differences between the nodes.

As described herein, epoch-LIFO queueing, which reduces median latency and prevents effective-throughput collapse, can be applied to distributed systems where operations are modeled as work-sequences. Each work item in a work-sequence can be split into multiple requests and queueing can apply to the requests on a per-request basis. As an example, for transaction processing of a distributed database system, a work-sequence is a transaction and each work item is a statement included in the transaction. In some cases, epoch-LIFO queueing allows for adaptively switching between FIFO and LIFO queueing techniques, allowing a distributed system to achieve low tail latency under a moderate load of requests and low median latency under an overload of requests.

Terms

"Cluster" generally refers to a deployment of computing devices that comprise a database. A cluster may be located in one or more geographic locations (e.g., data centers). The one or more geographic locations may be located within a single geographic region (e.g., eastern United States, central United States, etc.) or more than one geographic location. For example, a cluster may be located in both the eastern United States and western United States, with 2 data centers in the eastern United states and 4 data centers in the western United States.

"Node" generally refers to an individual computing device that is a part of a cluster. A node may join with one or more other nodes to form a cluster. One or nodes that comprise a cluster may store data (e.g., tables, indexes, etc.) in a map of KV pairs. A node may store a "range", which can be a subset of the KV pairs (or all of the KV pairs depending on the size of the range) stored by the cluster. A range may also be referred to as a "shard" and/or a "micro-partition". A table and its secondary indexes can be mapped to one or more ranges, where each KV pair in a range may represent a single row in the table (which can also be known as the primary index because the table is sorted by the primary key) or a single row in a secondary index. Based on the range reaching or exceeding a threshold storage size, the range may split into two ranges. For example, based on reaching 512 mebibytes (MiB) in size, the range may split into two ranges. Successive ranges may split into one or more ranges based on reaching or exceeding a threshold storage size.

"Index" generally refers to a copy of the rows corresponding to a single table, where the rows are sorted by one or more columns (e.g., a column or a set of columns) of the table. Each index may correspond and/or otherwise belong to a single table. In some cases, an index may include a type. An example of a first type of index may be a primary index. A primary index may be an index on row-identifying primary key columns. A primary key constraint may be applied to one or more columns of a table to uniquely identify each row of the table, such that the primary key adds structure to table data. For a column configured with a primary key constraint, values stored in the column(s) must uniquely identify each row. One or more columns of a table may be configured with a primary key constraint and the database that includes the table may automatically create an index (known as a primary index) for the primary key column(s). A primary key may be defined for each table stored by a database as described herein. An example of a second type of index may be a secondary index. A secondary index may be defined on non-primary key columns of a table. A table that does not include a defined primary index may include a hidden row ID (e.g., named rowid) column that uniquely identifies each row of the table as an implicit primary index.

"Replica" generally refers to a copy of a range. A range may be replicated a threshold number of times. For example, a range may be replicated 3 times into 3 distinct replicas. Each replica of a range may be stored on a distinct node of a cluster. For example, 3 replicas of a range may each be stored on a different node of a cluster. In some cases, a range may be required to be replicated a minimum of 3 times.

"Leaseholder" or "leaseholder replica" generally refers to a replica of a range that is configured to hold the lease for the replicas of the range. The leaseholder may receive and/or coordinate read transactions and write transactions directed to one or more KV pairs stored by the range. "Leaseholder node" may generally refer to the node of the cluster that stores the leaseholder replica. The leaseholder may receive read transactions and serve reads to client devices indicated by the read transactions. Other replicas of the range that are not the leaseholder may receive read transactions and route the read transactions to the leaseholder, such that the leaseholder can serve the read based on the read transaction.

"Raft leader" or "leader" generally refers to a replica of the range that is a leader for managing write transactions for a range. In some cases, the leader and the leaseholder are the same replica for a range (e.g., leader is inclusive of leaseholder and/or leaseholder is inclusive of leader). In other cases, the leader and the leaseholder are not the same replica for a range. "Raft leader node" or "leader node" generally refers to a node of the cluster that stores the leader. The leader may determine that a threshold number of the replicas of a range agree to commit a write transaction prior to committing the write transaction. In some cases, the threshold number of the replicas of the range may be a majority of the replicas of the range.

"Follower" generally refers to a replica of the range that is not the leader. "Follower node" may generally refer to a node of the cluster that stores the follower replica. Follower replicas may receive write transactions from the leader replica.

"Raft log" generally refers to a time-ordered log of write transactions to a range, where the log of write transactions includes write transactions agreed to by a threshold number of the replicas of the range. Each replica of a range may include a raft log stored on the node that stores the replica. A raft log may be a source of truth for replication among nodes for a range.

"Consistency" generally refers to causality and the ordering of transactions within a distributed system. Consistency defines rules for operations within the distributed system, such that data stored by the system will remain consistent with respect to read and write operations originating from different sources.

"Consensus" generally refers to a threshold number of replicas for a range, based on receiving a write transaction, acknowledging a write transaction. In some cases, the threshold number of replicas may be a majority of replicas for a range. Consensus may be achieved even if one or more nodes storing replicas of a range are offline, such that the threshold number of replicas for the range can acknowledge the write transaction. Based on achieving consensus, data modified by the write transaction may be stored within the ranges targeted by the write transaction.

"Replication" generally refers to creating and distributing copies (e.g., replicas) of the data stored by the cluster. In some cases, replication can ensure that replicas of a range remain consistent among the nodes that each comprise a replica of the range. In some cases, replication may be synchronous such that write transactions are acknowledged and/or otherwise propagated to a threshold number of replicas of a range before being considered committed to the range.

Database Overview

A database stored by a cluster of nodes may operate based on one or more remote procedure calls (RPCs). The database may be comprised of a KV store distributed among the nodes of the cluster. In some cases, the RPCs may be SQL RPCs. In other cases, RPCs based on other programming languages may be used. Nodes of the cluster may receive SQL RPCs from client devices. After receiving SQL RPCs, nodes may convert the SQL RPCs into operations that may operate on the distributed KV store.

In some embodiments, as described herein, the KV store of the database may be comprised of one or more ranges. A range may be a configured storage size. For example, a range may be 512 MiB. Each range may be replicated to more than one node to maintain data survivability. For example, each range may be replicated to at least 3 nodes. By replicating each range to more than one node, if a node fails, replica(s) of the range would still exist on other nodes such that the range can still be accessed by client devices and replicated to other nodes of the cluster.

In some embodiments, a node may receive a read transaction from a client device. A node may receive a write transaction from a client device. In some cases, a node can receive a read transaction or a write transaction from another node of the cluster. For example, a leaseholder node may receive a read transaction from a node that originally received the read transaction from a client device. In some cases, a node can send a read transaction to another node of the cluster. For example, a node that received a read transaction, but cannot serve the read transaction may send the read transaction to the leaseholder node. In some cases, if a node receives a read or write transaction that it cannot directly serve, the node may send and/or otherwise route the transaction to the node that can serve the transaction.

In some embodiments, modifications to the data of a range may rely on a consensus protocol to ensure a threshold number of replicas of the range agree to commit the change. The threshold may be a majority of the replicas of the range. The consensus protocol may enable consistent reads of data stored by a range.

In some embodiments, data may be written to and/or read from a storage device of a node using a storage engine that tracks the timestamp associated with the data. By tracking the timestamp associated with the data, client devices may query for historical data from a specific period of time.

In some embodiments, a "table descriptor" may correspond to each table of the database, where the table descriptor may contain the schema of the table and may include information associated with the table. Each table descriptor may be stored in a "descriptor table", where each version of a table descriptor may be accessed by nodes of a cluster. In some cases, a "descriptor" may correspond to any suitable schema or subset of a schema, where the descriptor may contain the schema or the subset of the schema and may include information associated with the schema (e.g., a state of the schema). Examples of a descriptor may include a table descriptor, type descriptor, database descriptor, and schema descriptor. A view and/or a sequence as described herein may correspond to a table descriptor. Each descriptor may be stored by nodes of a cluster in a normalized or a denormalized form. Each descriptor may be stored in a KV store by nodes of a cluster. In some embodiments, the contents of a descriptor may be encoded as rows in a database (e.g., SQL database) stored by nodes of a cluster. Descriptions for a table descriptor corresponding to a table may be adapted for any suitable descriptor corresponding to any suitable schema (e.g., user-defined schema) or schema element as described herein. In some cases, a database descriptor of a database may include indications of a primary region and one or more other database regions configured for the database.

In some embodiments, database architecture for the cluster of nodes may be comprised of one or more layers. The one or more layers may process received SQL RPCs into actionable processes to access, modify, store, and return data to client devices, while providing for data replication and consistency among nodes of a cluster. The layers may comprise one or more of: a SQL layer, a transactional layer, a distribution layer, a replication layer, and a storage layer.

In some cases, the SQL layer of the database architecture exposes a SQL application programming interface (API) to developers and converts high-level SQL statements into low-level read and write requests to the underlying KV store, which are passed to the transaction layer. The transaction layer of the database architecture can implement support for atomic, consistent, isolated, and durable (ACID) transactions by coordinating concurrent operations. The distribution layer of the database architecture can provide a unified view of a cluster's data. The replication layer of the database architecture can copy data between nodes and ensure consistency between these copies by implementing a consensus algorithm. The storage layer may commit writes from the Raft log to disk (e.g., a computer-readable storage medium on a node), as well as return requested data (e.g., reads) to the replication layer.

Database Architecture

Referring to FIG. 1, an illustrative distributed computing system 100 is presented. The computing system 100 may include a cluster 102. In some cases, the computing system may include one or more additional clusters 102. The cluster 102 may include one or more nodes 120 distributed among one or more geographic regions 110. The geographic regions may correspond to cluster regions and databased regions as described further below. A node 120 may be a computing device. In some cases, a node 120 may include at least portions of the computing system as described herein with respect to FIG. 7. As an example, a node 120 may be a server computing device. A region 110 may correspond to a particular building (e.g., a data center), city, state/province, country, geographic region, and/or a subset of any one of the above. A region 110 may include multiple elements, such as a country and a geographic identifier for the country. For example, a region 110 may be indicated by Country=United States and Region=Central, which may indicate a region 110 as the Central United States. As shown in FIG. 1, the cluster 102 may include regions 110a, 110b, and 110c. In some cases, the cluster 102 may include one region 110. In an example, the region 110a may be the Eastern United States, the region 110b may be the Central United States, and the region 110c may be the Western United States. Each region 110 of the cluster 102 may include one or more nodes 120. In some cases, a region 110 may not include any nodes 120. The region 110a may include nodes 120a, 120b, and 120c. The region 110b may include the nodes 120d, 120e, and 120f. The region 110c may include nodes 120g, 120h, and 120i.

Each node 120 of the cluster 102 may be communicatively coupled via one or more networks 112 and 114. In some cases, the cluster 102 may include networks 112a, 112b, and 112c, as well as networks 114a, 114b, 114c, and 114d. The networks 112 may include a local area network (LAN) and/or a wide area network (WAN). In some cases, the one or more networks 112 may connect nodes 120 of different regions 110. The nodes 120 of region 110a may be connected to the nodes 120 of region 110b via a network 112a. The nodes 120 of region 110a may be connected to the nodes 120 of region 110c via a network 112b. The nodes 120 of region 110b may be connected to the nodes 120 of region 110c via a network 112c. The networks 114 may include a LAN and/or a WAN. In some cases, the networks 114 may connect nodes 120 within a region 110. The nodes 120a, 120b, and 120c of the region 110a may be interconnected via a network 114a. The nodes 120d, 120e, and 120f of the region 110b may be interconnected via a network 114b. In some cases, the nodes 120 within a region 110 may be connected via one or more different networks 114. The node 120g of the region 110c may be connected to nodes 120h and 120i via a network 114c, while nodes 120h and 120i may be connected via a network 114d. In some cases, the nodes 120 of a region 110 may be located in different geographic locations within the region 110. For example, if region 110a is the Eastern United States, nodes 120a and 120b may be located in New York, while node 120c may be located in Massachusetts.

In some embodiments, the computing system 100 may include one or more client devices 106. The one or more client devices 106 may include one or more computing devices. In some cases, the one or more client device may each include at least portions of the computing system as described herein with respect to FIG. 7. In an example, the one or more client devices 106 may include laptop computing devices, desktop computing devices, mobile computing devices, tablet computing devices, and/or server computing device. As shown in FIG. 1, the computing system 100 may include client devices 106a, 106b, and one or more client devices 106 up to client device 106N, where N is any suitable number of client devices 106 included in the computing system 100. The client devices 106 may be communicatively coupled to the cluster 102, such that the client devices 106 may access and/or otherwise communicate with the nodes 120. One or more networks 111 may couple the client devices 106 the nodes 120. The one or more networks 111 may include a LAN, a WAN, and/or any other suitable network as described herein. As an example, the client devices 106 may communicate with the nodes 120 via a SQL client operating at each respective client device 106. To access and/or otherwise interact with the data stored by the cluster 102, a client device 106 may communicate with a gateway node, which may be a node 120 of the cluster that is closest (e.g., by latency, proximity, and/or any other suitable indication of closeness) to the client device 106. The gateway node may route communications between a client device 106 and any other node 120 of the cluster.

Transaction Execution

In some embodiments, as described herein, distributed transactional databases stored by the cluster of nodes may enable one or more transactions. Each transaction may include one or more requests and/or queries. A query may traverse one or more nodes of a cluster to execute the request. A request may interact with (e.g., sequentially interact with) one or more of the following: a SQL client, a load balancer, a gateway, a leaseholder, and/or a Raft Leader as described herein. A SQL client may send a query to a cluster. A load balancer may route the request from the SQL client to the nodes of the cluster. A gateway may be a node that processes the request and/or responds to the SQL client. A leaseholder may be a node that serves reads and coordinates writes for a range of keys (e.g., keys indicated in the query) as described herein. A Raft leader may be a node that maintains consensus among the replicas for a range.

A SQL client (e.g., operating at a client device 106a) may send a request (e.g., a SQL request) to a cluster (e.g., cluster 102). The request may be sent over a network (e.g., the network 111). A load balancer may determine a node of the cluster to which to send the request. The node may be a node of the cluster having the lowest latency and/or having the closest geographic location to the computing device on which the SQL client is operating. A gateway node (e.g., node 120a) may receive the request from the load balancer. The gateway node may parse the request to determine whether the request is valid. The request may be valid based on conforming to the SQL syntax of the database(s) stored by the cluster. The gateway node may generate a logical SQL plan based on the request. The logical plan may be converted to a physical plan to traverse the nodes indicated by the request. Based on the completion of request parsing, a SQL executor may execute the logical SQL plan and/or physical plan using the TCS as described herein. A Transaction Coordination Sender (TCS) may perform one or more operations as a part of the transaction layer. The TCS may perform KV operations on a database stored by the cluster. The TCS may account for keys indicated and/or otherwise involved in a transaction. The TCS may package KV operations into a Batch Request as described herein, where the Batch Request may be forwarded on to a Distribution Sender (DistSender) of the gateway node.

A DistSender of a gateway node and/or coordinating node may receive Batch Requests from a TCS of the same node. The DistSender of the gateway node may receive the Batch Request from the TCS. The DistSender may determine the operations indicated by the Batch Request and may determine the node(s) (e.g., the leaseholder node(s)) that should receive requests corresponding to the operations for the range. The DistSender may generate one or more Batch Requests based on determining the operations and the node(s) as described herein. The DistSender may send a first Batch Request for each range in parallel. Based on receiving a provisional acknowledgment from a leaseholder node's evaluator, the DistSender may send the next Batch Request for the range corresponding to the provisional acknowledgement. The DistSender may wait to receive acknowledgments for write operations and values for read operations corresponding to the sent Batch Requests.

As described herein, the DistSender of the gateway node may send Batch Requests to leaseholders (or other replicas) for data indicated by the Batch Request. In some cases, the DistSender may send Batch Requests to nodes that are not the leaseholder for the range (e.g., based on out of date leaseholder information). Nodes may or may not store the replica indicated by the Batch Request. Nodes may respond to a Batch Request with one or more responses. A response may indicate the node is no longer a leaseholder for the range. The response may indicate the last known address of the leaseholder for the range. A response may indicate the node does not include a replica for the range. A response may indicate the Batch Request was successful if the node that received the Batch Request is the leaseholder. The leaseholder may process the Batch Request. As a part of processing of the Batch Request, each write operation in the Batch Request may compare a timestamp of the write operation to the timestamp cache. A timestamp cache may track the highest timestamp (e.g., most recent) for any read operation that a given range has served. The comparison may ensure that the write operation has a higher timestamp than the timestamp cache. If a write operation has a lower timestamp than the timestamp cache, the write operation may be restarted at a timestamp higher than the value of the timestamp cache.

In some embodiments, operations indicated in the Batch Request may be serialized by a latch manager of a leaseholder. For serialization, each write operation may be given a latch on a row. Any read and/or write operations that arrive after the latch has been granted on the row may be required to wait for the write to complete. Based on completion of the write, the latch may be released and the subsequent operations can continue. In some cases, a batch evaluator may ensure that write operations are valid. The batch evaluator may determine whether the write is valid based on the leaseholder's data. The leaseholder's data may be evaluated by the batch evaluator based on the leaseholder coordinating writes to the range. If the batch evaluator determines the write to be valid, the leaseholder may send a provisional acknowledgement to the DistSender of the gateway node, such that the DistSender may begin to send subsequent Batch Requests for the range to the leaseholder.

In some embodiments, operations may read from the local instance of the storage engine as described herein to determine whether write intents are present at a key. If write intents are present, an operation may resolve write intents as described herein. If the operation is a read operation and write intents are not present at the key, the read operation may read the value at the key of the leaseholder's storage engine. Read responses corresponding to a transaction may be aggregated into a Batch Response by the leaseholder. The Batch Response may be sent to the DistSender of the gateway node. If the operation is a write operation and write intents are not present at the key, the KV operations included in the Batch Request that correspond to the write operation may be converted to Raft operations and write intents, such that the write operation may be replicated to the replicas of the range. The leaseholder may propose the Raft operations to the leader replica of the Raft group (e.g., which is typically the leaseholder). Based on the received Raft operations, the leader replica may send the Raft operations to the follower replicas of the Raft group. If a threshold number of the replicas acknowledge the Raft operations (e.g., the write operations), consensus may be achieved such that the Raft operations may be committed to the Raft log of the leader replica and written to the storage engine. The leader replica may send a command to the follower replicas to write the Raft operations the Raft log corresponding to each of the follower replicas. Based on the leader replica committing the Raft operations to the Raft log, the Raft operations (e.g., the write transaction) may be considered to be committed (e.g., implicitly committed as described herein). The gateway node may configure the status transaction record for the transaction corresponding to the Raft operations to committed (e.g., explicitly committed as described herein).

In some embodiments, based on the leader replica appending the Raft operations to the Raft log, the leader replica may send a commit acknowledgement to the DistSender of the gateway node. The DistSender of the gateway node may aggregate commit acknowledgements from each write operation included in the Batch Request. In some cases, the DistSender of the gateway node may aggregate read values for each read operation included in the Batch Request. Based on completion of the operations of the Batch Request, the DistSender may record the success of each transaction in a corresponding transaction record. To record the success of a transaction, the DistSender may check the timestamp cache of the range where the first write transaction occurred to determine whether the timestamp for the write transaction was advanced. If the timestamp was advanced, the transaction may perform a read refresh to determine whether values associated with the transaction had changed. If the read refresh is successful (e.g., no values associated with the transaction had changed), the transaction may commit at the advanced timestamp. If the read refresh fails (e.g., at least some value associated with the transaction had changed), the transaction may be restarted. Based on determining the read refresh was successful and/or that the timestamp was not advanced for a write transaction, the DistSender may change the status of the corresponding transaction record to committed as described herein. The DistSender may send values (e.g., read values) to the TCS. The TCS may send the values to the SQL layer. In some cases, the TCS may also send a request to the DistSender, wherein the request includes an indication for the DistSender to convert write intents to committed values (e.g., MVCC values). The SQL layer may send the values as described herein to the SQL client that initiated the query.

Read Transaction Execution

Figure 2A:
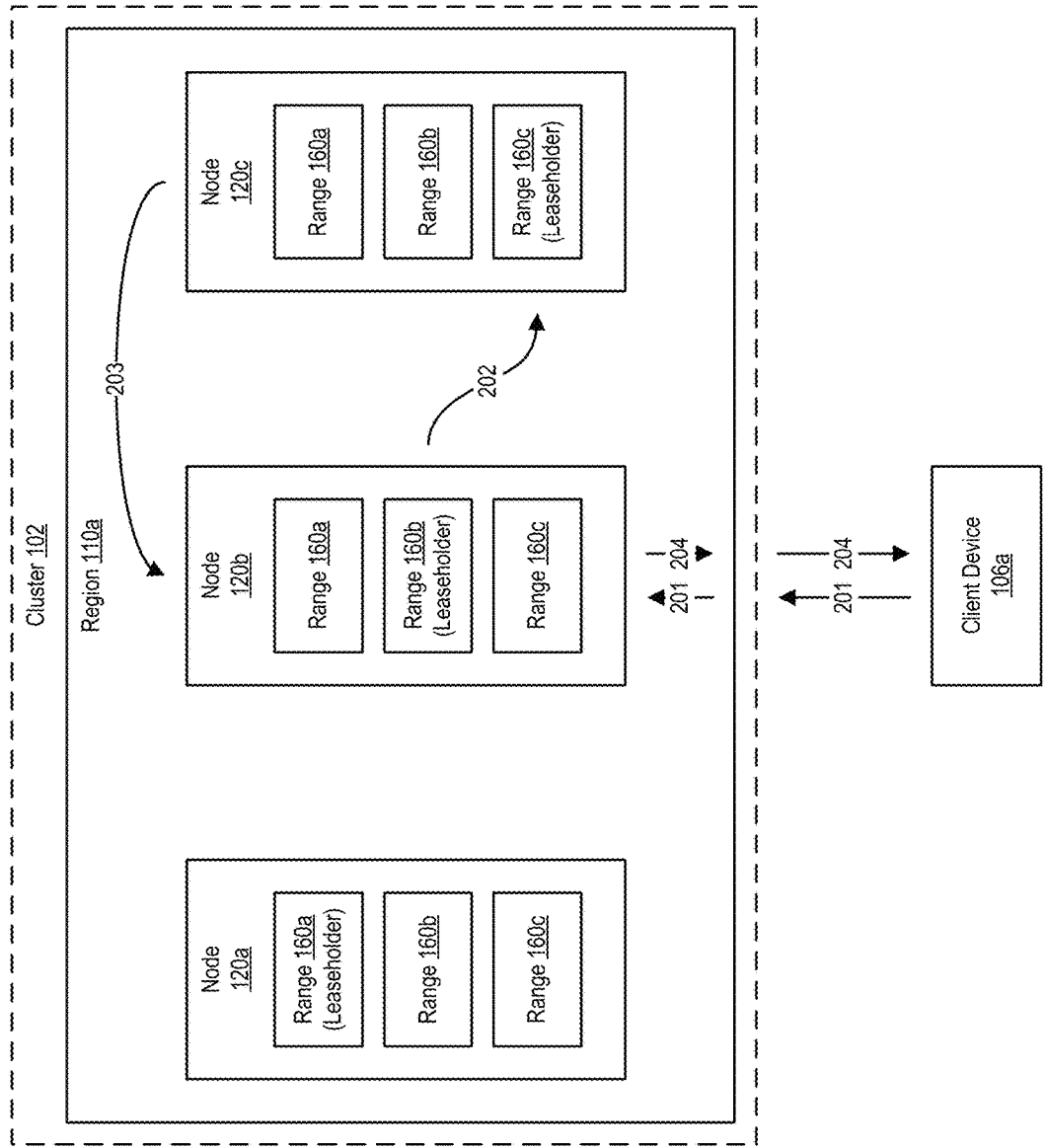
FIG. 2A shows an example of execution of a read transaction at the computing system, according to some embodiments.

Referring to FIG. 2A, an example of execution of a read transaction at the computing system 100 is presented. In some cases, the nodes 120a, 120b, and 120c, of region 110a may include one or more replicas of ranges 160. The node 120a may include replicas of ranges 160a, 160b, and 160c, wherein ranges 160a, 160b, and 160c are different ranges. The node 120a may include the leaseholder replica for range 160a (as indicated by "Leaseholder" in FIG. 2A). The node 120b may include replicas of ranges 160a, 160b, and 160c. The node 120b may include the leaseholder replica for range 160b (as indicated by "Leaseholder" in FIG. 2A). The node 120c may include replicas of ranges 160a, 160b, and 160c. The node 120c may include the leaseholder replica for range 160c (as indicated by "Leaseholder" in FIG. 2A). While FIG. 2A is described with respect to communication between nodes 120 of a single region (e.g., region 110a), a read transaction may operate similarly between nodes 120 located within different geographic regions.

In some embodiments, a client device 106 may initiate a read transaction at a node 120 of the cluster 102. Based on the KVs indicated by the read transaction, the node 120 that initially receives the read transaction (e.g., the gateway node) from the client device 106 may route the read transaction to a leaseholder of the range 160 comprising the KVs indicated by the read transaction. The leaseholder of the range 160 may serve the read transaction and send the read data to the gateway node. The gateway node may send the read data to the client device 106.

As shown in FIG. 2A, at step 201, the client device 106 may send a read transaction to the cluster 102. The read transaction may be received by node 120b as the gateway node. The node 120b may be a node 120 located closest to the client device 106, where the closeness between the nodes 120 and a client device 106 may correspond to a latency and/or a proximity as described herein. The read transaction may be directed to data stored by the range 160c. At step 202, the node 120b may route the received read transaction to node 120c. The read transaction may be routed to node 120c based on the node 120c being the leaseholder of the range 160c. The node 120c may receive the read transaction from node 120b and serve the read transaction from the range 160c. At step 203, the node 120c may send the read data to the node 120b. The node 120c may send the read data to node 120b based on the node 120b being the gateway node for the read transaction. The node 120b may receive the read data from node 120c. At step 204, the node 120b may send the read data to the client device 106a to complete the read transaction. If node 120b had been configured to include the leaseholder for the range 160c, the node 120b may have served the read data to the client device directly after step 201, without routing the read transaction to the node 120c.

Write Transaction Execution

Figure 2B:
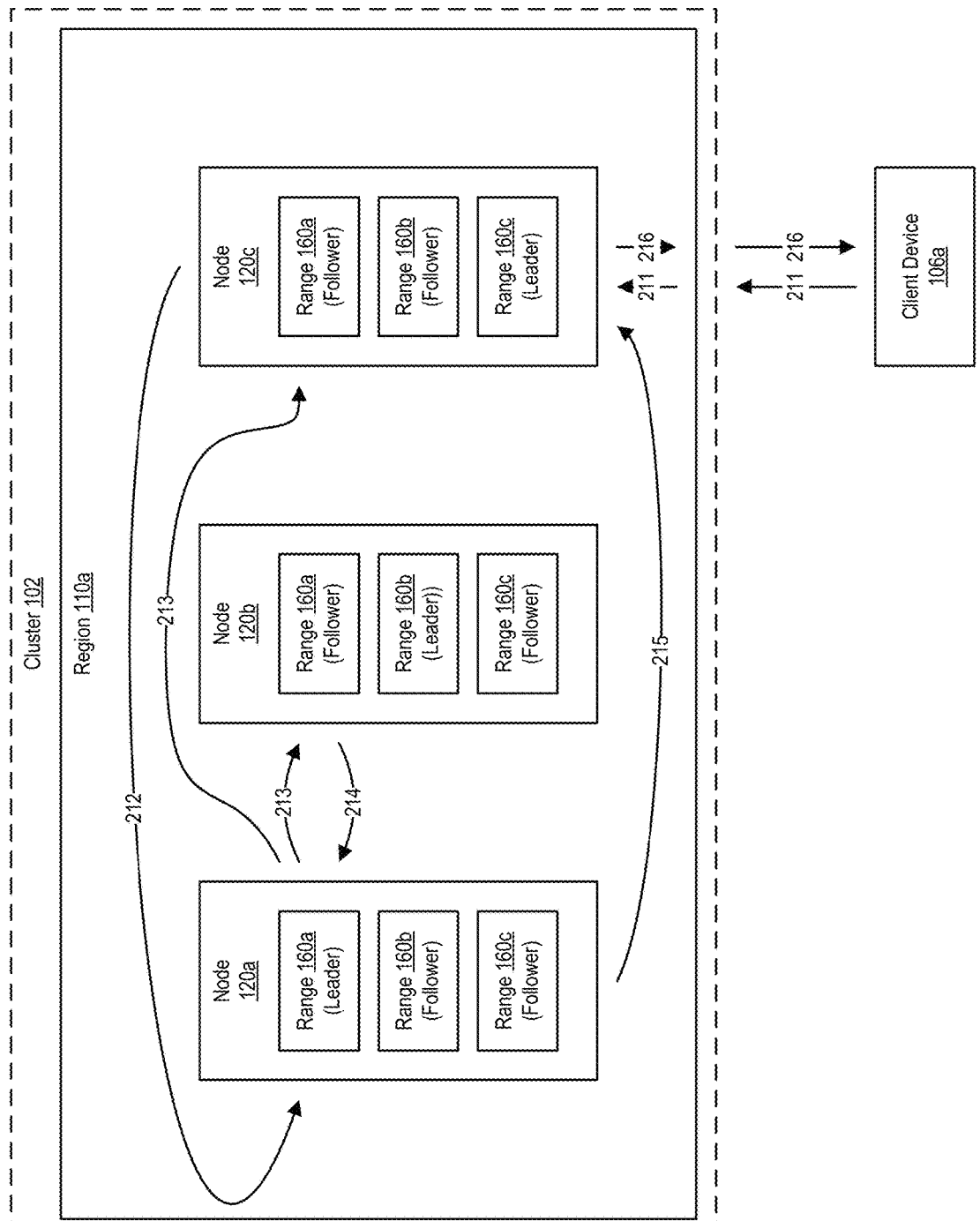
FIG. 2B shows an example of execution of a write transaction at the computing system, according to some embodiments.

Referring to FIG. 2B, an example of execution of a write transaction at the computing system 100 is presented. In some cases, as described herein, the nodes 120a, 120b, and 120c, of region 110a may include one or more replicas of ranges 160. The node 120a may include replicas of ranges 160a, 160b, and 160c, wherein ranges 160a, 160b, and 160c are different ranges. The node 120a may include the leaseholder replica and the leader replica for range 160a (as indicated by "Leaseholder" in FIG. 2A and "Leader" in FIG. 2B). The node 120b may include replicas of ranges 160a, 160b, and 160c. The node 120b may include the leader replica for range 160b (as indicated by "Leader" in FIG. 2B). The node 120c may include replicas of ranges 160a, 160b, and 160c. The node 120c may include the leader replica for range 160c (as indicated by "Leader" in FIG. 2B). While FIG. 2B is described with respect to communication between nodes 120 of a single region (e.g., region 110a), a write transaction may operate similarly between nodes 120 located within different geographic regions.

In some embodiments, a client device 106 may initiate a write transaction at a node 120 of the cluster 102. Based on the KVs indicated by the write transaction, the node 120 that initially receives the write transaction (e.g., the gateway node) from the client device 106 may route the write transaction to a leaseholder of the range 160 comprising the KVs indicated by the write transaction. The leaseholder of the range 160 may route the write request to the leader replica of the range 160. In most cases, the leaseholder of the range 160 and the leader replica of the range 160 are the same. The leader replica may append the write transaction to a Raft log of the leader replica and may send the write transaction to the corresponding follower replicas of the range 160 for replication. Follower replicas of the range may append the write transaction to their corresponding Raft logs and send an indication to the leader replica that the write transaction was appended. Based on a threshold number (e.g., a majority) of the replicas indicating and/or sending an indication to the leader replica that the write transaction was appended, the write transaction may be committed by the leader replica. The leader replica may send an indication to the follower replicas to commit the write transaction. The leader replica may send an acknowledgement of a commit of the write transaction to the gateway node. The gateway node may send the acknowledgement to the client device 106.

As shown in FIG. 2B, at step 211, the client device 106 may send a write transaction to the cluster 102. The write transaction may be received by node 120c as the gateway node. The write transaction may be directed to data stored by the range 160a. At step 212, the node 120c may route the received write transaction to node 120a. The write transaction may be routed to node 120a based on the node 120a being the leaseholder of the range 160a. Based on the node 120a including the leader replica for the range 160a, the leader replica of range 160a may append the write transaction to a Raft log at node 120a. At step 213, the leader replica may simultaneously send the write transaction to the follower replicas of range 160a on the node 120b and the node 120c. The node 120b and the node 120c may append the write transaction to their respective Raft logs. At step 214, the follower replicas of the range 160a (at nodes 120b and 120c) may send an indication to the leader replica of the range 160a that the write transaction was appended to their Raft logs. Based on a threshold number of replicas indicating the write transaction was appended to their Raft logs, the leader replica and follower replicas of the range 160a may commit the write transaction. At step 215, the node 120a may send an acknowledgement of the committed write transaction to the node 120c. At step 216, the node 120c may send the acknowledgement of the committed write transaction to the client device 106a to complete the write transaction.

Epoch-LIFO Queuing

As described herein, operations (e.g., user operations) directed to a distributed system (e.g., the cluster 102) can be modeled as work-sequences including one or more work items, where each work item in a work-sequence may be ordered after or concurrently with another work item. A work item (e.g., statement) of a work-sequence (e.g., transaction) can include one or more requests, where each request can be directed to a single node of a number of nodes included in the distributed system. In some cases, the distributed system (e.g., computing system 100) may partition each work item into multiple requests for execution and/or service by nodes (e.g., nodes 120) of a cluster (e.g., cluster 102). Queuing of requests received by a node may be performed on a per-request basis. Through use of epoch-LIFO queuing as described herein, a median latency for completion of work-sequences can be kept low (e.g., to about 50-100 ms), below a threshold amount of time (e.g., deadline), even in the presence of significant overload.

In some embodiments, epoch-LIFO queuing used by the distributed system may be based on an epoch time duration E and a threshold work-sequence time duration D. The epoch time duration E may be required to be less than the threshold work-sequence time duration D (e.g., such that E<D). An actual amount of time required to execute the work items included in a work-sequence when no queueing is required may be referred to as W (or work sequence execution time). For the distributed system, a sum of epoch time duration E and work sequence execution time W may be less than a threshold work-sequence time duration D (e.g., such that E+W<D). In some cases, the epoch time duration E may be based on a multiple of an expected clock synchronization skew between nodes of the cluster. For example, for an expected clock synchronization skew of 1 ms, the epoch time duration E may be approximately 5-100 times larger than the expected clock synchronization skew and may be approximately 5 ms-100 ms.

In some cases, for each node of a distributed system, time at each respective node is divided into a number of epoch time durations E. As an example, the number of epoch time durations at a node may be ordered as [0, E), [E, 2*E), [2*E, 3*E), etc. When a work-sequence (e.g., transaction) is received by the cluster and begins, the gateway node of the cluster that received the work-sequence can assign the work-sequence a starting timestamp TS. Based on receiving the work sequence, the gateway node may separate the work-sequence into individual work items (e.g., statements) included in the work-sequence, where each work item is directed to an individual node of the cluster. In some cases, the gateway node may separate each of the individual work items into individual requests (e.g., one or more individual requests) included in each work item. Based on separating each work item into one or more individual requests, the gateway node may send each request to a node that is subject to the respective request, such that the request can execute at the node (referred to herein as a "receiving node"). In some cases, based on separating the work-sequence into individual work items, the gateway node may send each work item to a respective receiving node that is subject to the work item. Receiving nodes may each receive one or more work items sent from a gateway node. Based on receiving the work item(s), each respective receiving node may separate each of the individual work items into individual requests included in each work item. A receiving node may assign all received requests included in and/or otherwise corresponding to the work-sequence to an epoch identified by a number N, where the number N is an integer equivalent to the assigned starting timestamp TS of the work-sequence divided by the epoch time duration E using integer division techniques (e.g., N=TS/E). In some cases, an epoch corresponding to a respective epoch number N may be referred to as epoch N. Each of the requests assigned to the epoch N may be queued in an ordered sequence based on their respective assigned starting timestamps TS and/or the order each request was assigned to the queue (e.g., as described herein with respect to an open epoch heap and a waiting heap). Each of the requests assigned to the epoch N may be queued until an epoch closing time TC at which the epoch N closes. Requests assigned to an epoch N may be referred to as included in the epoch N. An epoch N may have an associated epoch closing time TC, which may be defined by Equation 1:

$$\text{Epoch closing time } TC = E*(N+1)+\Delta \quad (1)$$

As described by Equation 1, a grace period ($\Delta$) may be selected based on an expected clock synchronization skew between nodes of the cluster. The grace period may be selected by an individual associated with the distributed system. As an example, the grace period ($\Delta$) can be less than 1 ms. As another example, the grace period may be about 1-10 ms. In some cases, alternate or additional techniques may be used to define an epoch closing time TC. In some cases, a receiving node may determine to close an epoch as described herein (e.g., with respect to FIG. 4)

In some embodiments, after the epoch N closes at the epoch closing time TC, the queued requests in epoch N may be executed in LIFO order at the respective receiving node. Executing the queued requests in epoch N in LIFO order can include executing earlier queued requests after executing later queued requests. For example, a last queued request for the epoch N may be the first of the queued requests to execute and a first queued request for the epoch N may be the last of the queued requests to execute. In some cases, requests may only execute after being assigned to a waiting group as described herein (e.g., with respect to FIG. 3). Queued requests assigned to (e.g., included in) the waiting group may execute at the respective receiving node in LIFO order as described herein.

In some embodiments, based on a number N of an epoch being assigned based on the starting timestamp TS of the work-sequence corresponding to the epoch, all requests included in the respective work-sequence are assigned to the same epoch. In some cases, more than one work-sequence can be assigned to the same epoch based on a starting timestamp TS assigned each respective work-sequence. For example, a first work-sequence assigned a starting timestamp TS of 320 ms and a second work-sequence assigned a starting timestamp TS of 370 ms may both be assigned to an epoch number 3 when the epoch time duration E is 100 ms. In some cases, any number (e.g., thousands) of work-sequences may be assigned to the same epoch based on a rate at which work-sequences are received by the cluster and epoch time duration E.

Based on E+W<D as described herein, an epoch N will close at a time (e.g., epoch closing time TC) that is sufficiently before a deadline to execute and complete each of the work items included in the work-sequence. In some cases, a deadline to execute and complete work items included in a work-sequence may be based on a threshold amount of time and an assigned timestamp TS of the work-sequence. As an example, the deadline to execute and complete work items included in a work-sequence may be a sum of a selected, threshold amount of time and an assigned timestamp TS of the work-sequence. In some cases, a minimum latency to execute and complete a work-sequence may be equivalent to a sum of an epoch time duration E and a grace period A that is selected based on expected clock synchronization skew between nodes of the cluster (e.g., such that minimum latency for a work sequence is equivalent to E+$\Delta$). In some cases, for a work sequence, it is acceptable for a latency to range from approximately 50 ms to 100 m. Accordingly, in some cases, an epoch time duration E may be selected to be in the interval [50 ms, 100 ms]. By delaying execution of queued requests in LIFO order until after the epoch closes at time TC, the epoch-LIFO queueing technique can guarantee that a fixed pool of work-sequences are competing for computing resources of nodes of the cluster. By guaranteeing that a fixed pool of work-sequences can compete for resources, the epoch-LIFO queueing technique can prevent newly received work-sequences from starting to execute. In conventional queuing systems, newly received work-sequences would receive priority above earlier received work-sequences that may have had at least some of their requests executed.

To further illustrate epoch-LIFO queuing techniques, an exemplary distributed transaction processing system may have transaction deadlines selected to be 1 second, work execution time W may be approximately 10 ms, and an epoch time duration E may be selected to be 100 ms. Operations described herein may be executed by nodes (e.g., nodes 120) of a cluster (e.g., cluster 102), where transactions may be sent to the cluster by at least one client device (e.g., client device 106). For a distributed transaction processing system using epoch-LIFO queuing techniques as described herein, a transaction may be received by a node (e.g., gateway node) and assigned a starting timestamp TS of 590 ms. A receiving node that receives request(s) included in the transaction may assign the received request(s) to an epoch number 5 (e.g., N=5) corresponding to the time interval [500 ms, 600 ms). The request(s) received and queued by the receiving node may begin executing after the epoch closing time TC. For an epoch number N of 5, an epoch time duration E of 100 ms, and a grace period ($\Delta$) of 1 ms, the epoch closing time TC is 601 ms. Based on the transaction (and the included request(s)) having an assigned starting timestamp TS of 590 ms and corresponding to epoch 5, the transaction is likely to see low LIFO queueing based on the assigned starting timestamp TS of 590 ms being temporally located toward the end of the [500 ms, 600 ms) interval of the epoch, such that the transaction will be preferred over other transactions with a starting timestamp in the interval [500 ms, 590 ms). As an example, if the transaction queues for 15 ms and can fully execute in 10 ms, the transaction (and request(s) included in the transaction) will complete at 626 ms based on a sum of the transaction queuing time (e.g., 15 ms), the time to execute the transaction (e.g., 10 ms), and the epoch closing time TC (e.g., 601 ms). The total latency for the transaction may be equivalent to a difference of the transaction completion time (e.g., 626 ms) and the assigned starting timestamp TS of 590, such that the total latency is 36 ms.

In some embodiments, for a transaction that fully executes and completes (e.g., by executing and returning a response to a client device), the latency of the transaction may be lower bounded by assigned starting timestamp TS, the epoch time duration E, and the work sequence execution time W. For example for a transaction having an assigned starting timestamp TS of 500 ms, the latency of the transaction may be 111 ms based on an epoch time duration E of 100 ms, a work-sequence execution time W of 10 ms, and a grace period (Δ) of 1 ms. If resources are actually overloaded, such epoch 5 transactions that have an assigned starting timestamp TS early in the epoch interval [500 ms, 600 ms) may not be likely to execute, since the epoch 5 transactions may still be in the queue when the next epoch interval of [600 ms, 700 ms) for epoch 6 closes and the epoch 5 transactions will be of lower priority than the transactions corresponding to epoch 6 as described herein.

In some embodiments, requests included in work-sequences received by nodes of a cluster may be assigned to and ordered in ordered data structures (e.g., on a per-node basis), where the ordered data structure orders the requests based on a priority (e.g., timestamp, assigned queueing technique, tenant priority, etc.) corresponding to each request. One example of such an ordered data structure is a heap, which is used herein for illustrative purposes. Additional or alternative data structures may be used as described herein with respect to a heap. In some cases, requests included in work-sequences received by nodes of a cluster may be assigned to and ordered in a respective heap of two heaps. Requests assigned to each of the two heaps may be ordered based on one or more criteria. As an example, the one or more criteria can include priority and a timestamp (e.g., an assigned starting timestamp TS), where requests having a same priority are queued according to a decreasing timestamp (e.g., as discussed for LIFO queueing). A request may be assigned to respective heap based on the epoch number N assigned to the work-sequence that includes the request. A first heap may be an open epoch heap and a second heap may be a waiting heap. The open epoch heap may include an ordered sequence of requests that are awaiting execution and that correspond to epochs that are open (e.g., not yet closed), where the requests are ordered based on an increasing epoch number N, such that requests with lower epoch numbers are ordered for execution before requests having higher epoch numbers. As an example, a first request corresponding to epoch 6 may be ordered (e.g., ordered to execute) before a second request corresponding to epoch 7. In the open epoch heap, for requests corresponding to the same epoch number N, the requests may be ordered based on an increasing assigned starting timestamp TS for each respective request. As an example, for a first request and second request that both are included in an open epoch 5, the first request having a lowest assigned starting timestamp (e.g., corresponding to the work-sequence including the first request) may be ordered before the second request having a highest assigned starting timestamp (e.g., corresponding to the work-sequence including the second request).

In some cases, the waiting heap may include an ordered sequence of requests assigned to closed epochs that are awaiting execution, where the requests are ordered according to a decreasing assigned starting timestamp TS, such that requests with higher assigned starting times are ordered for execution before requests having lower assigned starting times. As an example, for a first request and second request that both are included in a closed epoch 5, the first request having a lowest assigned starting timestamp may be ordered after the second request having a highest assigned starting time. A node (e.g., receiving node) may execute requests ordered in the waiting heap and may not execute requests assigned to (e.g., included in) the open epoch heap. Based on an epoch closing as described herein, requests included in the open epoch heap that correspond to the closed epoch may be assigned to the waiting epoch heap for execution. In some cases, a node (e.g., receiving node) may execute a request or queue a request for execution based on a heap corresponding to the request as described herein (e.g., with respect to FIG. 5).

Figure 3:
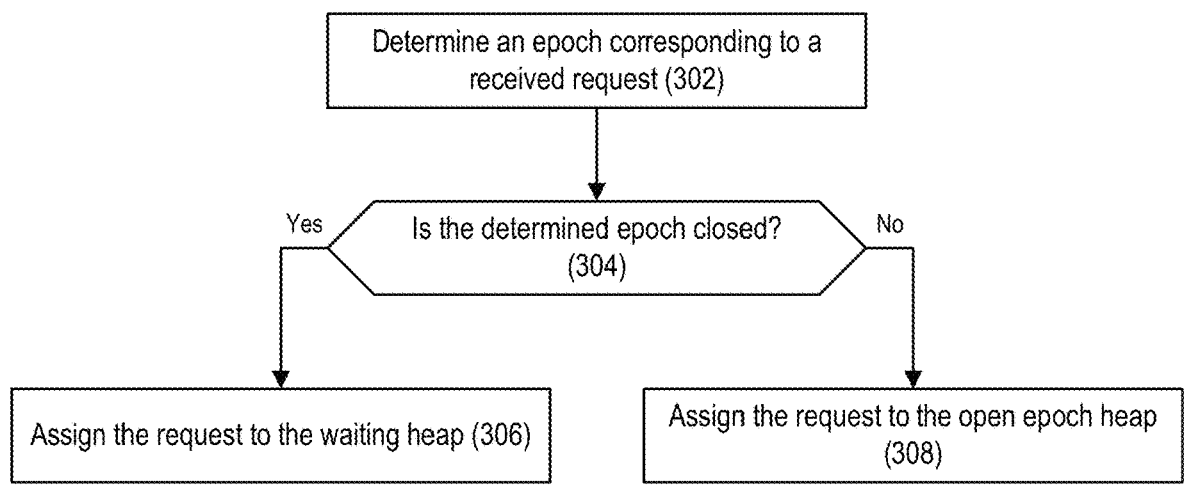
FIG. 3 shows an exemplary flowchart of a method for assigning a request to a heap, according to some embodiments.

FIG. 3 shows an exemplary flowchart of a method 300 for assigning a received request to a heap, according to some embodiments. As described above, a node (e.g., gateway node) assigns a starting timestamp TS to a work-sequence when the node receives the work sequence, where the starting timestamp TS is assigned to each request included in the work sequence. A node may execute method 300 to assign each received request of one or more received work items to an open epoch heap or a waiting heap for execution based on an epoch number N corresponding to the respective request. The node may be configured to execute the method 300 if the node is a receiving node configured to receive request(s) from the gateway node and execute the request(s).

At step 302, a node may determine an epoch corresponding to the request. A node may assign a request to an epoch identified by a number N as described herein based on a starting timestamp TS corresponding to the request and an epoch time duration E. As an example, the node may determine epoch 6 corresponds to the request based on a starting timestamp TS of 630 ms and an epoch time duration E of 100 ms (e.g., 630 ms/100 ms=epoch number 6 by integer division).

At step 304, the node may determine whether the epoch (e.g., determined at step 302) is closed. The node may determine whether the epoch is closed based if the present time at the node is greater than or equal to the epoch closing time TC of the epoch. If the epoch is determined to be closed, the method 300 may proceed to step 306. If the epoch is open, the method may proceed to step 308. The present time may be a time indicated by a clock corresponding to the node.

At step 306, the node may assign the request (e.g., from step 302) to the waiting heap for execution. The request may be assigned according to the ordering for the waiting heap as described herein.

At step 308, the node may assign the request (e.g., from step 302) to the open epoch heap to await execution. A request awaiting execution may include awaiting assignment to the waiting heap for execution. The request may be assigned according to the ordering for the open epoch heap as described herein.

Figure 4:
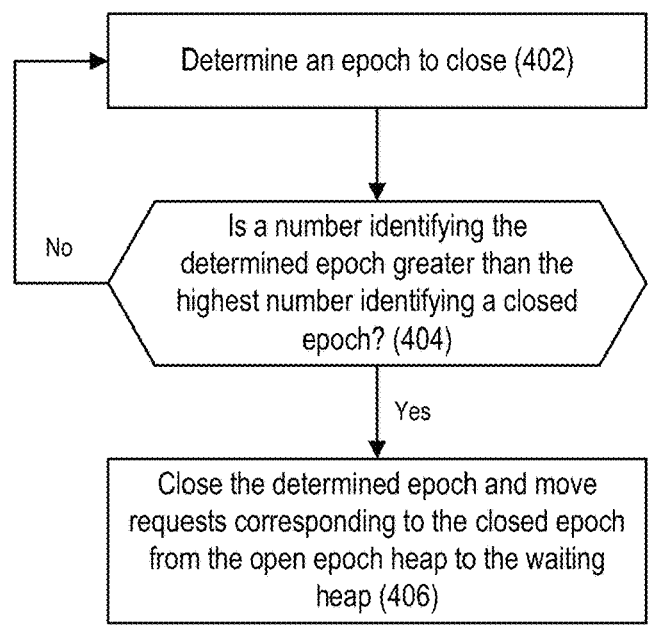
FIG. 4 shows an exemplary flowchart of a method for determining to close an epoch, according to some embodiments

FIG. 4 shows an exemplary flowchart of a method 400 for determining to close an epoch, according to some embodiments. As described above, an epoch closing time TC for epoch N can be defined according to Equation 1. A node may execute method 400 to determine to close an epoch and move one or more requests corresponding to the closed epoch from the open epoch heap to the waiting epoch heap. The node may be configured to execute the method 400 if the node is a receiving node configured to receive request(s) from the gateway node and execute the request(s).

At step 402, the node may determine an epoch to close at a present time t. The node may determine the epoch to close by determining an epoch identified by the epoch number as defined by Equation 2:

$$\text{Epoch number } N \text{ of the epoch to close} = t - \Delta/E - 1 \qquad (2)$$

As described by Equation 2, t may be a present time determined by the node, a grace period (Δ) may be selected based on an expected clock synchronization skew between nodes of the cluster, and E may be an epoch time duration as described herein. Division operations included in Equation 2 may be integer division operations. In some cases, alternate or additional techniques may be used to define an epoch number of the epoch to close. The present time may be a time indicated by a clock corresponding to the node.

At step 404, the node may determine whether the number N identifying the epoch to close (e.g., determined at step 402) is greater than a highest number identifying a closed epoch. If the number N identifying the epoch to close (e.g., determined at step 402) is not greater than the highest number identifying a closed epoch, the method 400 may proceed to step 402. If the number N identifying the epoch to close (e.g., determined at step 402) is greater than the highest number identifying a closed epoch, the method 400 may proceed to step 406.

At step 406, based on the number N identifying the epoch to close (e.g., determined at step 402) being greater than the highest number identifying a closed epoch, the node may close the epoch to close (e.g., determined at step 402) and may move requests corresponding to the now closed epoch from the open epoch heap to the waiting heap for execution.

In some embodiments, the method 400 may execute based on a present time being equal to an epoch closing time TC for epoch N. In some cases, the method 400 may periodically execute.

Figure 5:
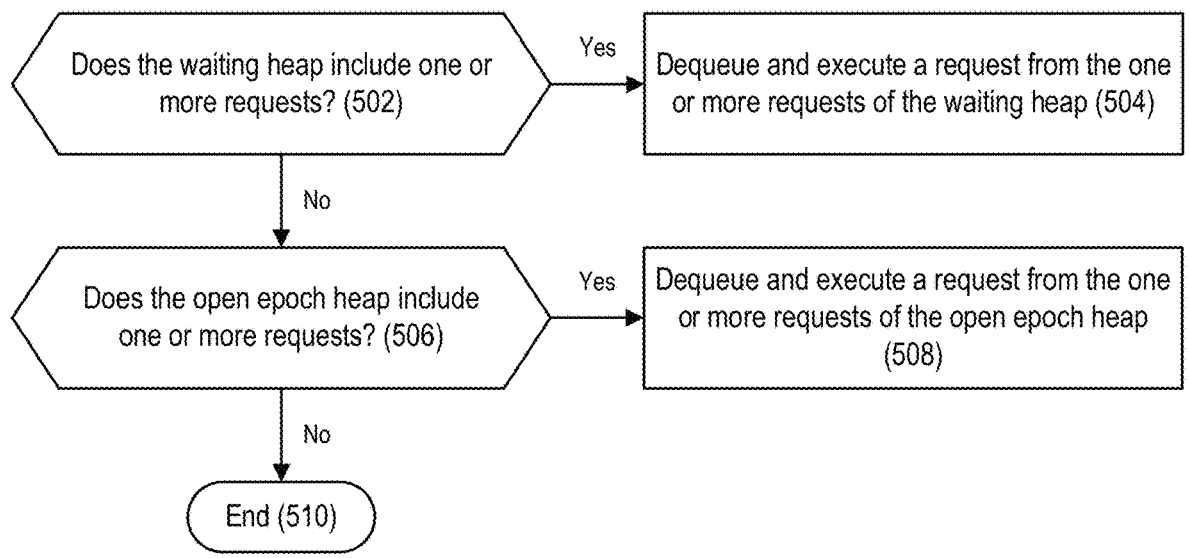
FIG. 5 shows an exemplary flowchart of a method for determining to execute a request, according to some embodiments.

FIG. 5 shows an exemplary flowchart of a method 500 for determining to execute and/or otherwise service a request, according to some embodiments. A node may execute method 500 to determine to: (i) execute a request included in the waiting heap, (ii) execute a request included in the open epoch heap, or (iii) wait for a request to be assigned to the waiting heap or open epoch heap. The node may be configured to execute the method 500 if the node is a receiving node configured to receive request(s) from the gateway node and execute the request(s). A request dequeued and executed from the waiting heap or the open epoch heap, respectively, may be a first ordered request in the respective heap, where request(s) included in each heap are ordered as described herein. Requests assigned to the waiting heap or the open epoch heap may be included in the respective heap.

At step 502, the node may determine whether the waiting heap includes one or more requests. The waiting heap may include an ordered sequence of one or more requests assigned to closed epochs that are awaiting execution as described herein. If the node determines the waiting heap includes one or more requests, the method may proceed to step 504. If the node determines the waiting heap does not include one or more requests, the method may proceed to step 506.

At step 504, the node may dequeue and execute a request from the one or more requests included in the waiting heap. The request that is dequeued and executed may be the first of the ordered sequence of requests included in the waiting heap.

At step 506, the node may determine whether the open epoch heap includes one or more requests. The open epoch heap may include an ordered sequence of requests assigned to an open epoch heap that are awaiting execution as described herein. If the node determines the open epoch heap includes one or more requests, the method may proceed to step 508. If the node determines the open epoch heap does not include one or more requests, the method may proceed to step 510.

At step 508, the node may dequeue and execute a request from the one or more requests included in the open epoch group. The request that is dequeued and executed may be the first of the ordered sequence of requests included in the open epoch group.

At step 510, the method 500 may end based on a lack of requests included in both the open epoch group and the waiting group. If neither of the open epoch group or waiting group include a request, the method 500 may end.

In some embodiments, the method 500 may execute based on a request being assigned to the waiting group and/or the open epoch group. In some cases, the method 500 may periodically execute.

While ordering of received requests is described herein with respect to an assigned starting timestamp TS, requests may be additionally or alternatively queued based on explicit timestamps assigned to and/or included in each respective request.

Switching Between FIFO and Epoch-LIFO Queuing

In some embodiments, a distributed system (e.g., computing system 100) that uses epoch-LIFO queuing for requests as described herein may monitor a queueing delay for executed requests. A queueing delay may correspond to an amount of time for which a request is queued (e.g., queued at a receiving node) prior to execution. A queueing delay may be determined for a single request or a group of requests. For example, the queueing delay may be a moving average queueing delay for a selected number of received requests. In some embodiments, the distributed system (e.g., a node of the distributed system) may compare a monitored queueing delay for a request or a group of requests to a threshold queueing delay. If the monitored queueing delay is less than or equal to the threshold queueing delay, the distributed system may switch from using epoch-LIFO queueing techniques as described herein to using FIFO queueing techniques for received requests. For example, after determining a queuing delay for an executed request is less than or equal to the threshold queueing delay, subsequently received request(s) may be assigned to use FIFO queuing techniques. If the monitored queueing delay is greater than the threshold queueing delay, the distributed system may switch from using FIFO queueing techniques to using epoch-LIFO queueing techniques for received requests. For example, after determining a queuing delay for an executed request is greater than the threshold queueing delay, subsequently received request(s) may be assigned to use epoch-LIFO queuing techniques.

In some embodiments, an individual request may be assigned to use epoch-LIFO or FIFO queueing techniques at a time when the request is received by a node based on the monitored queueing delay. In some cases, a selected number of received requests may be assigned to use FIFO queuing techniques after determining the monitored queueing delay is less than or equal to the threshold queueing delay.

In some embodiments, the waiting heap can include one or more requests assigned to use FIFO queueing techniques and/or one or more requests assigned to use epoch-LIFO queueing techniques. If the waiting heap includes one or more requests assigned to use FIFO queueing techniques, the requests assigned to use FIFO queueing techniques may be ordered after the requests assigned to use LIFO queueing techniques. Requests assigned to use FIFO queueing techniques may be dequeued and executed after requests with higher assigned starting timestamps TS if the latter requests were assigned to use epoch-LIFO queueing. If the waiting heap includes more than one request that is each assigned to use FIFO queueing, the requests can be relatively ordered by FIFO queueing based on their respective assigned starting timestamps TS. For example, for first and second requests included in the waiting heap that are assigned to use FIFO queueing techniques, if the first request has a lower assigned starting timestamp TS than the second request, the first request may be dequeued and executed before the second request. In some cases, if an open epoch corresponding to request(s) included in the open epoch heap closes, the requests(s) may be reassigned from the open epoch heap to the waiting heap and may execute before request(s) assigned to use FIFO queuing that are included in the waiting heap.

Additional Queueing Criteria

In some embodiments, to order requests of received work-sequences for execution by nodes of a distributed system (e.g., computing system 100), additional ordering criteria may be used in combination with epoch-LIFO queueing. In some cases, the requests may be ordered for execution based on a tuple corresponding to each received work item. Each tuple may include a tenant identifier for a tenant associated with the work item and/or a priority indicator indicating a priority level (e.g., high or low priority) for the work corresponding to a respective tenant. A tuple corresponding to a work item may correspond to each of the requests included in the work item. The priority indicator of a tuple for a work item may correspond to the work item's priority for the tenant. Priority used for a tenant can allow for starvation, such that if higher priority work is always consuming all resources, the lower priority work will wait for an indefinite amount of time (e.g., forever) to be executed. In some cases, priority execution of a request may be ordered from higher to lower priority as: inter-tenant priority, priority within a tenant, and epoch-LIFO queueing and/or FIFO queueing. Accordingly, each tenant of a distributed system (e.g., computing system 100) may correspond to a waiting group and an open epoch group, where requests corresponding to higher priority tenants execute before requests corresponding to lower priority tenants.

Figure 6:
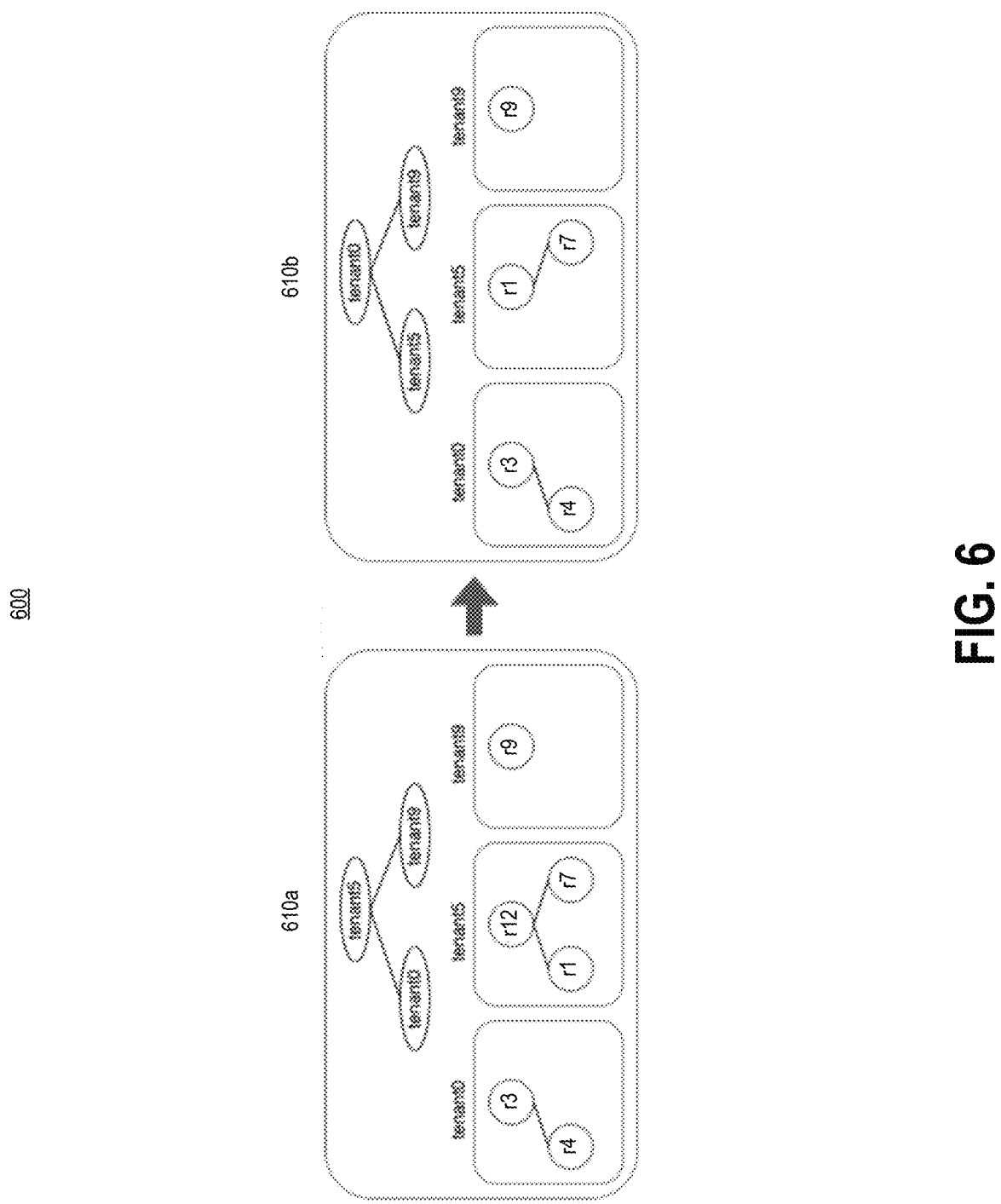
FIG. 6 is an exemplary illustration of a queue of requests, according to some embodiments.

FIG. 6 is an exemplary illustration 600 of a queue of requests. The illustration 600 shows a queue for execution of requests before and after servicing and/or executing request(s) included in a request r12 based on its respective tuple compared to the tuples of other work items. The illustration 600 includes requests referred to as request "r" with a respective assigned starting timestamp TS, including requests r3, r4, r12, r1, r7, and r9. Each request may be directed to a same receiving node. The illustration 600 includes queues 610a and 610b. Queue 610a corresponds to a time before a dequeuing and execution of request r12. Queue 610b corresponds to a time after the dequeuing and execution of the request r12. As shown, the queues 610a and 610b include requests corresponding to tenants referred to as tenant0, tenant5, and tenant9. Tenants having requests queued for execution can be ordered in a grouping referred to as a "tenant heap" based on any suitable technique. For example, tenant 5 may be ordered for request execution before tenant0 and tenant9 in the tenant heap of queue 610a, while tenant0 may be ordered for request execution before tenant5 and tenant9 in the tenant heap of queue 610b.

As shown in FIG. 6 with respect to queue 610a, tenant0 includes a waiting heap of requests r3 and r4, where the requests are assigned to use FIFO queueing. Tenant5 includes a waiting heap of requests r12, r1, and r7, where requests r1 and r7 are assigned to use FIFO queueing and r12 is assigned to use epoch-LIFO queueing. Tenant9 includes a waiting heap with request r9, where request r9 is assigned to use FIFO queueing. Based on the requests and assigned queuing techniques corresponding to each tenant (e.g., ordered based on the tuples corresponding to each work item in the queue) and based on the ordering of the tenant heap, the receiving node may dequeue and execute requests from the waiting heaps of the tenants. With respect to the queue 610a, the receiving node may dequeue and execute the request r12 from the waiting group of tenant5. The request r12 may be executed based on tenant5 having a higher priority than tenant0 and tenant9 in the tenant heap and based on request r12 being assigned to use epoch-LIFO queueing.

As shown in FIG. 6 with respect to queue 610b, tenant0 includes a waiting heap of requests r3 and r4, where the requests are assigned to use FIFO queueing. Tenant5 includes a waiting heap of requests r1 and r7, where requests r1 and r7 are assigned to use FIFO queueing. Tenant9 includes a waiting heap with request r9, where request r9 is assigned to use FIFO queueing. Based on the requests and assigned queuing techniques corresponding to each tenant (e.g., ordered based on the tuples corresponding to each work item in the queue) and based on the ordering of the tenant heap, the receiving node may dequeue and execute requests from the waiting heaps of the tenants. With respect to the queue 610b, the receiving node may dequeue and execute the request r3 from the waiting group of tenant0. The request r3 may be executed based on tenant0 having a higher priority than tenant5 and tenant9 in the tenant heap and based on request r3 being assigned to use FIFO queueing.

Further Description of Some Embodiments

Figure 7:
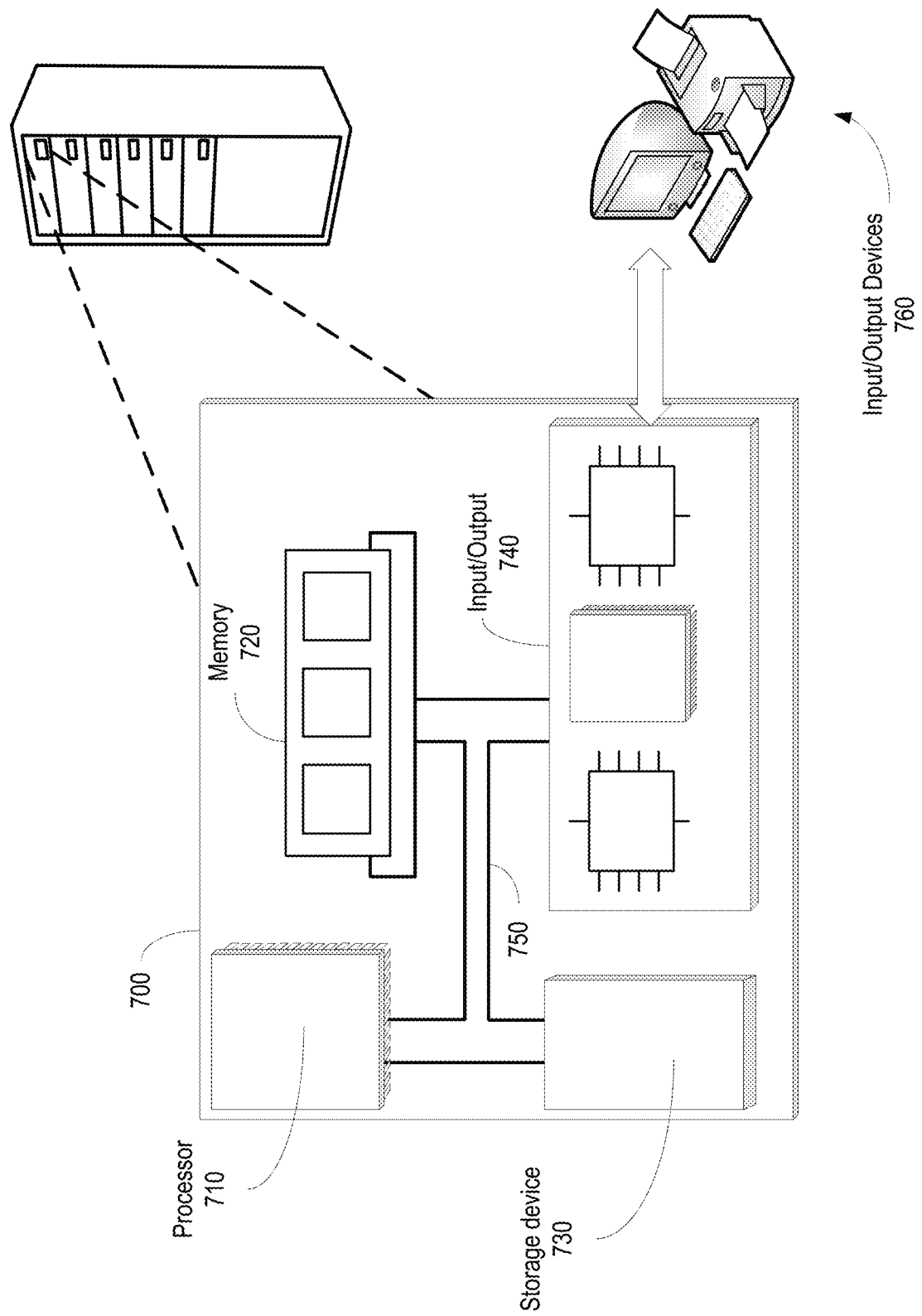
FIG. 7 is a block diagram of an example computer system, according to some embodiments.

FIG. 7 is a block diagram of an example computer system 700 that may be used in implementing the technology described in this document. General-purpose computers, network appliances, mobile devices, or other electronic systems may also include at least portions of the system 700. The system 700 includes a processor 710, a memory 720, a storage device 730, and an input/output device 740. Each of the components 710, 720, 730, and 740 may be interconnected, for example, using a system bus 750. The processor 710 is capable of processing instructions for execution within the system 700. In some implementations, the processor 710 is a single-threaded processor. In some implementations, the processor 710 is a multi-threaded processor. The processor 710 is capable of processing instructions stored in the memory 720 or on the storage device 730.

The memory 720 stores information within the system 700. In some implementations, the memory 720 is a non-transitory computer-readable medium. In some implementations, the memory 720 is a volatile memory unit. In some implementations, the memory 720 is a non-volatile memory unit.

The storage device 730 is capable of providing mass storage for the system 700. In some implementations, the storage device 730 is a non-transitory computer-readable medium. In various different implementations, the storage device 730 may include, for example, a hard disk device, an optical disk device, a solid-date drive, a flash drive, or some other large capacity storage device. For example, the storage device may store long-term data (e.g., database data, file system data, etc.). The input/output device 740 provides input/output operations for the system 700. In some implementations, the input/output device 740 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 760. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 730 may be implemented in a distributed way over a network, for example as a server farm or a set of widely distributed servers, or may be implemented in a single computing device.

Although an example processing system has been described in FIG. 7, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for managing requests in a distributed computing system comprising a plurality of computing nodes, the method comprising:
   receiving, by one or more of the plurality of computing nodes in the distributed computing system, a plurality of requests;
   assigning a respective timestamp to each of the plurality of requests;
   assigning a first subset of the plurality of requests to a first epoch of a plurality of epochs, wherein each of the plurality of epochs comprises a respective predetermined closing time of a plurality of predetermined closing times, and wherein the first epoch corresponds to a first interval of time comprising the respective timestamp of each request of the first subset of the plurality of requests;
   comparing a present time to the predetermined closing time of the first epoch, wherein the predetermined closing time of the first epoch is after the first interval of time and based on (i) a duration of the first interval of time and (ii) a grace period of time; and
   queuing, based on the comparison and when the present time is equivalent to or greater than the predetermined closing time of the first epoch, the first subset of the plurality of requests for execution in a waiting data structure by last-in, first-out (LIFO) ordering based on the respective timestamp of each request of the first subset.

2. The method of claim 1, wherein a work-sequence comprises one or more work items, and wherein the one or more work items comprise the first subset of the plurality of requests.

3. The method of claim 1, wherein each respective timestamp is assigned by a respective gateway node of the plurality of computing nodes in the distributed computing system.

4. The method of claim 1, wherein each request of the first subset of the plurality of requests is directed to a receiving node of the plurality of computing nodes in the distributed computing system.

5. The method of claim 4, wherein the present time corresponds to a time of a clock of the receiving node.

6. The method of claim 1, further comprising:
   receiving, by a receiving node of the plurality of computing nodes in the distributed computing system, the first subset of the plurality of requests.

7. The method of claim 1, wherein comparing the present time to the predetermined closing time of the first epoch further comprises:
   determining the present time is less than the predetermined closing time of the first epoch or determining the present time is equivalent to or greater than the predetermined closing time of the first epoch.

8. The method of claim 1, further comprising:
   queuing, based on the comparison and when the present time is less than the predetermined closing time of the first epoch, the first subset of the plurality of requests for execution in an open data structure by first-in, first-out (FIFO) ordering based on the respective timestamp of each request of the first subset.

9. The method of claim 8, further comprising:
   determining (i) the waiting data structure does not include at least one request of the plurality of requests and (ii) the open data structure includes at least one request of the plurality of requests; and
   dequeuing, based on the determination, the at least one request from the open data structure for execution.

10. The method of claim 8, further comprising:
    moving, based on the comparison and when the present time is equivalent to or greater than the predetermined closing time of the first epoch, the first subset of the plurality of requests from the open data structure to the waiting data structure.

11. The method of claim 1, further comprising:
    determining the waiting data structure includes at least one request of the plurality of requests; and
    dequeuing, based on the determination, the at least one request from the waiting data structure for execution.

12. The method of claim 1, wherein the grace period of time is selected based on an expected clock synchronization skew between the plurality of computing nodes.

13. The method of claim 1, wherein the queuing the first subset of the plurality of requests for execution in the waiting data structure further comprises:
    queuing the first subset of the plurality of requests for execution in the waiting data structure (i) by last-in, first-out (LIFO) ordering based on the respective timestamp of each request of the first subset and (ii) based on a respective priority level of each request of the first subset.

14. The method of claim 1, further comprising:
    assigning a second subset of the plurality of requests to a second epoch of the plurality of epochs, wherein the second epoch corresponds to a second interval of time comprising the respective timestamp of each request of the second subset of the plurality of requests, and wherein the timestamp assigned to at least one request of the second subset of the plurality of requests is (i) greater than the timestamps assigned to the first subset of the plurality of requests and (ii) less than the predetermined closing time of the first epoch.

15. The method of claim 14, wherein the first epoch and the second epoch are consecutive, and wherein the second interval of time is directly after the first interval of time.

16. The method of claim 14, wherein a duration of the second interval of time is equivalent to the duration of the first interval of time.

17. A system for managing requests comprising:
    a plurality of computing nodes programmed to perform operations comprising:
       receiving, by one or more of the plurality of computing nodes, a plurality of requests;
       assigning a respective timestamp to each of the plurality of requests;
       assigning a first subset of the plurality of requests to a first epoch of a plurality of epochs, wherein each of the plurality of epochs comprises a respective predetermined closing time of a plurality of predetermined closing times, and wherein the first epoch corresponds to a first interval of time comprising the respective timestamp of each request of the first subset of the plurality of requests;

comparing a present time to the predetermined closing time of the first epoch, wherein the predetermined closing time of the first epoch is after the first interval of time and based on (i) a duration of the first interval of time and (ii) a grace period of time; and queuing, based on the comparison and when the present time is equivalent to or greater than the predetermined closing time of the first epoch, the first subset of the plurality of requests for execution in a waiting data structure by last-in, first-out (LIFO) ordering based on the respective timestamp of each request of the first subset.

18. The system of claim 17, wherein a work-sequence comprises one or more work items, and wherein the one or more work items comprise the first subset of the plurality of requests.

19. The system of claim 17, wherein each respective timestamp is assigned by a respective gateway node of the plurality of computing nodes.

20. The system of claim 17, wherein each request of the first subset of the plurality of requests is directed to a receiving node of the plurality of computing nodes.

21. The system of claim 20, wherein the present time corresponds to a time of a clock of the receiving node.

22. The system of claim 17, wherein the operations further comprise:

receiving, by a receiving node of the plurality of computing nodes, the first subset of the plurality of requests.

23. The system of claim 17, wherein comparing the present time to the predetermined closing time of the first epoch further comprises:

determining the present time is less than the predetermined closing time of the first epoch or determining the present time is equivalent to or greater than the predetermined closing time of the first epoch.

24. The system of claim 17, wherein the operations further comprise:

queuing, based on the comparison and when the present time is less than the predetermined closing time of the first epoch, the first subset of the plurality of requests for execution in an open data structure by first-in, first-out (FIFO) ordering based on the respective timestamp of each request of the first subset.

25. The system of claim 24, wherein the operations further comprise:

determining (i) the waiting data structure does not include at least one request of the plurality of requests and (ii) the open data structure includes at least one request of the plurality of requests; and dequeuing, based on the determination, the at least one request from the open data structure for execution.

26. The system of claim 24, wherein the operations further comprise:

moving, based on the comparison and when the present time is equivalent to or greater than the predetermined closing time of the first epoch, the first subset of the plurality of requests from the open data structure to the waiting data structure.

27. The system of claim 17, wherein the operations further comprise:

determining the waiting data structure includes at least one request of the plurality of requests; and dequeuing, based on the determination, the at least one request from the waiting data structure for execution.

28. The system of claim 17, wherein the grace period of time is selected based on an expected clock synchronization skew between the plurality of computing nodes.

29. The system of claim 17, wherein the queuing the first subset of the plurality of requests for execution in the waiting data structure further comprises:

queuing the first subset of the plurality of requests for execution in the waiting data structure (i) by last-in, first-out (LIFO) ordering based on the respective timestamp of each request of the first subset and (ii) based on a respective priority level of each request of the first subset.

30. The system of claim 17, wherein the operations further comprise:

assigning a second subset of the plurality of requests to a second epoch of the plurality of epochs, wherein the second epoch corresponds to a second interval of time comprising the respective timestamp of each request of the second subset of the plurality of requests, and wherein the timestamp assigned to at least one request of the second subset of the plurality of requests is (i) greater than the timestamps assigned to the first subset of the plurality of requests and (ii) less than the predetermined closing time of the first epoch.

31. The system of claim 30, wherein the first epoch and the second epoch are consecutive, and wherein the second interval of time is directly after the first interval of time.

32. The system of claim 30, wherein a duration of the second interval of time is equivalent to the duration of the first interval of time.

* * * * *